(12) United States Patent
Pereira-Almao et al.

(10) Patent No.: US 8,283,279 B2
(45) Date of Patent: Oct. 9, 2012

(54) ULTRADISPERSED CATALYST COMPOSITIONS AND METHODS OF PREPARATION

(75) Inventors: Pedro Pereira-Almao, Calgary (CA); Vieman Alberto Ali-Marcano, Calgary (CA); Francisco Lopez-Linares, Calgary (CA); Alejandro Vasquez, Calgary (CA)

(73) Assignee: University of Calgary, Calgary, Alberta (CA)

( * ) Notice: Subject to any disclaimer, the term of this patent is extended or adjusted under 35 U.S.C. 154(b) by 0 days.

(21) Appl. No.: 12/987,005

(22) Filed: Jan. 7, 2011

(65) Prior Publication Data

US 2011/0105315 A1 May 5, 2011

Related U.S. Application Data

(62) Division of application No. 11/604,131, filed on Nov. 22, 2006, now Pat. No. 7,897,537.

(60) Provisional application No. 60/739,182, filed on Nov. 23, 2005.

(51) Int. Cl.
*B01J 27/02* (2006.01)
*B01J 27/047* (2006.01)
*B01J 27/051* (2006.01)
*B01J 27/049* (2006.01)
*B01J 27/043* (2006.01)
*B01J 27/045* (2006.01)

(52) U.S. Cl. ........ 502/216; 502/219; 502/220; 502/221; 502/222; 502/223

(58) Field of Classification Search .......... 502/216, 502/219–223
See application file for complete search history.

(56) References Cited

U.S. PATENT DOCUMENTS

| | | | |
|---|---|---|---|
| 3,017,368 A * | 1/1962 | Elliott, Jr. et al. ............ 502/220 |
| 3,663,431 A | 5/1972 | Wagner | |
| 3,993,592 A | 11/1976 | Van Thillo et al. | |
| 4,142,962 A | 3/1979 | Yates et al. | |
| 4,303,634 A | 12/1981 | Gatsis | |
| 4,491,639 A * | 1/1985 | Happel et al. ................ 502/219 |
| 4,542,121 A | 9/1985 | Mitchell, III et al. | |
| 4,547,321 A | 10/1985 | Stiefel et al. | |
| 4,557,821 A | 12/1985 | Lopez et al. | |
| 4,592,827 A | 6/1986 | Galiasso et al. | |
| 4,596,785 A | 6/1986 | Toulhoat et al. | |
| 4,748,142 A | 5/1988 | Chianelli et al. | |
| 4,820,677 A | 4/1989 | Jacobson et al. | |
| 4,824,821 A | 4/1989 | Lopez et al. | |
| 4,973,397 A * | 11/1990 | Ho ............................... 208/112 |
| 5,010,049 A | 4/1991 | Villa-Garcia et al. | |
| 5,484,755 A | 1/1996 | Lopez | |
| 5,565,091 A | 10/1996 | Iino et al. | |
| 5,578,197 A | 11/1996 | Cyr et al. | |
| 6,004,454 A | 12/1999 | Yuansheng et al. | |
| 6,162,350 A | 12/2000 | Soled et al. | |
| 6,190,542 B1 | 2/2001 | Connolli et al. | |
| 6,635,599 B1 | 10/2003 | Eijsbouts et al. | |
| 6,746,597 B2 | 6/2004 | Zhou et al. | |
| 6,860,987 B2 | 3/2005 | Plantenga et al. | |
| 7,396,799 B2 | 7/2008 | Chen et al. | |
| 7,951,746 B2 | 5/2011 | Bai et al. | |
| 8,092,672 B2 | 1/2012 | Ganguli et al. | |
| 2006/0058174 A1 | 3/2006 | Chen et al. | |
| 2011/0150938 A1 | 6/2011 | Cao et al. | |

FOREIGN PATENT DOCUMENTS

| | | |
|---|---|---|
| CN | 1840617 | 10/2006 |
| EP | 0 357 295 | 3/1990 |
| EP | 0 496 592 | 7/1992 |
| WO | WO 2007/059621 | 5/2007 |

OTHER PUBLICATIONS

International Search Rep. for PCT/CA2006/001921 mailed Mar. 14, 2007, 7 pgs.
A. Wang et al. "Hydrodesulfurization of Dibenzothiophene over Proton-Exchanged Siliceous MCM-41 Supported Bimetallic Sulfides," Studies in Surface Science and Catalysis, vol. 154, pp. 2930-2935 (2004).
Espino et al., "Comparative study of $WS_2$ and Co(Ni)/ $WS_2$ HDS catalysts prepared by ex situ/in situ activation of ammonium thiotungstate", Catalysis Letters vol. 90, No. 1, pp. 71-80 (2003).
Hamid A. Al-Megren et al. "Comparison of bulk CoMo bulk metallic carbide, oxide, nitride, and sulfide catalysts for pyridine hydrodenitrogenation," Journal of Molecular Catalysis A: Chemical 225, pp. 143-148 (2005).
Haoquan Hu et al. "Coal liquefaction with in situ impregnated Fe2(M0S4)3 bimetallic catalyst," Fuel 81 pp. 1521-1524 (2002).
Huirache-Acuña et al., "Synthesis of Ni-Mo-W sulphide catalysts by ex situ decomposition of trimetallic precursors", Ap. Catalysis A: General 304, pp. 124-130 (2006).
Mochida, I. and Sakanishi, K., "Catalysis in Coal Liquefaction", D.D. Eley, Advances in Catalysis, vol. 40, pp. 39-85, Academic Press, Inc., San Diego, CA (1994).
My A. Boutbila et al. "Point defects in the bimetallic sulfides MCr2S4 (M = V, Fe, or Mn): Comparison with CuCrS2 and the corresponding monometallic sulfides," Journal of Alloys and Compounds 283, pp. 88-90 (1999). Okamoto, "Preparation and Characterization of Co-Mo Model Sulfide Catalysts for Hydrodesulfurization", J. of Japan Petroleum Inst. 46, pp. 343-358 (2003).
Huirache-Acuña et al., "Ni(Co)-Mo-W sulphide unsupported HDS catalysts by ex situ decomposition of alkylthiomolybdotungstates", Applied Catalysis A: General 308, pp. 134-142 (2006).

* cited by examiner

*Primary Examiner* — Patricia L Hailey
(74) *Attorney, Agent, or Firm* — Squire Sanders (US) LLP

(57) ABSTRACT

The present invention relates generally to ultradispersed catalyst compositions and methods for preparing such catalysts. In particular, the invention provides catalyst composition of the general formula:

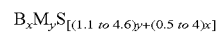

$$B_x M_y S_{[(1.1 \ to \ 4.6)y + (0.5 \ to \ 4)x]}$$

where B is a group VIIIB non-noble metal and M is a group VI B metal and $0.05 \leq y/x \leq 15$.

7 Claims, No Drawings

ULTRADISPERSED CATALYST COMPOSITIONS AND METHODS OF PREPARATION

PRIORITY

This application is a divisional of U.S. application Ser. No. 11/604,131, filed 22 Nov. 2006, now U.S. Pat. No. 7,897,537 which in turn claims the benefit of U.S. provisional patent application 60/739,182, filed 23 Nov. 2005.

FIELD OF THE INVENTION

The present invention relates generally to ultradispersed catalyst compositions and methods for preparing such catalysts.

BACKGROUND OF THE INVENTION

The use of catalysts in the processing of hydrocarbons is well known. Catalysts enable hydrocarbon processing reactions, such as hydrotreating, hydrocracking, steam cracking or upgrading reactions, to proceed more efficiently under various reaction conditions with the result that the overall efficiency and economics of a process are enhanced. Different catalysts are more effective in certain reactions than others and, as a result, significant research is conducted into the design of catalysts in order to continue to improve the efficiencies of reactions. Many factors such as catalyst chemistry, particle size, support structure and the reaction chemistry to produce the catalyst are very important in determining the reaction efficiency and effectiveness as well as the economics of a particular catalyst.

Catalysts can be generally categorized in one of two classes, namely supported and unsupported catalysts. Supported catalysts are more widely used due to several advantages including the high surface area available to anchor active phases (usually metals) predominantly responsible for the catalytic activity on the support. Supported catalysts may also be advantaged over unsupported catalysts as no separation of catalysts from reactants is required from within or outside the reaction vessel.

While effective in many applications, supported catalysts can be disadvantaged when performing under conditions and with feedstocks that inevitably produce solid deposits within the porous network of the catalyst support. In such cases a progressive loss of catalyst performance due to pore plugging occurs, making larger quantities of catalysts required for a given process to ensure that the reactions progress efficiently.

Unsupported catalysts are not physically supported on a solid matrix; they may be less expensive to produce as no solid support matrix is required. In reactions where unsupported catalysts are soluble in the reaction media, they may be disadvantaged by the difficulties of recovering them from the products stream which will increase reaction or production costs as catalysts must be replaced or, alternatively requires that the reactants are subjected to costly separation processes. Frequently, unsupported metal based catalysts with equivalent particle size or diameter than supported catalysts offer lower surface area of catalytic active phases. However, unsupported catalysts with particle size below the micron range are advantaged over supported catalysts by increasing the surface area available of active sites for reaction and thus, may enable a reaction to proceed more efficiently as compared to a reaction utilizing a supported catalyst.

While there is no universal rule with respect to the superiority of one class of catalyst over another, in many systems, a primary consideration in choosing or designing a catalyst system is the potential trade-off between the reaction efficiency and costs of unsupported catalysts versus supported catalysts.

As a result, there is a continued need for catalyst compositions for use in certain reactions wherein the reaction efficiencies of unsupported catalysts are combined with the cost efficiencies of supported catalysts.

Furthermore, there has been a need for catalyst compositions in the micro to nanometer size to enhance surface area efficiencies. Ideally, catalyst compositions in this size range should be produced from relatively simple chemistry so as to minimize production costs. It is also an advantage if such unsupported catalyst compositions can be readily separated from the reaction process so as to enable effective recovery and recycling of the catalyst back to the reaction process.

SUMMARY OF THE INVENTION

It is an object of the present invention to obviate or mitigate at least one disadvantage of conventional catalysts.

In accordance with the invention, there is provided catalyst compositions of the general formula:

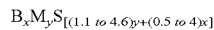

where B is a group VIIIB non-noble metal and M is a group VI B metal and $0.05 \leq y/x \leq 15$. In various embodiments, $0.125 \leq y/x \leq 8$, $0.2 \leq y/x \leq 6$ or $y/x = 3$.

In accordance with a further embodiment, the invention provides catalyst compositions of the general formula:

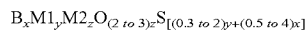

where B is a group VIIIB non-noble metal and M1 and M2 are group VI B metals and $0.05 \leq y/x \leq 15$ and $1 \leq z/x \leq 14$. In various embodiments, $0.2 \leq y/x \leq 6$ and z/x is $10 \leq z/x \leq 14$ or z/x is 12. In another series of embodiments $1 \leq z/x \leq 5$ or $z/x = 3$.

In various embodiments, the ultradispersed suspension is characterized by a median particle diameter between 30 nm to 6000 nm or 60 nm to 2500 nm.

In a further embodiment, the invention provides a method of preparing a bi-metallic ultradispersed catalyst comprising the steps of: preparing a first precursor solution containing a metal salt of a Group VIII B metal; preparing a second precursor solution containing a metal salt of a Group VI B and a sulphiding agent; admixing the first and second precursor solutions with a hydrocarbon feedstock to form separate microemulsions; and, admixing the first microemulsion with the second microemulsion to form a bi-metallic microemulsion mixture.

In one embodiment, the bi-metallic microemulsion mixture is subjected to a decomposition process to form an ultradispersed catalyst composition. In other embodiments, the bi-metallic microemulsion mixture is introduced into a reaction process to form an ultradispersed catalyst composition within the reaction process.

In a still further embodiment, the invention provides a method of preparing a tri-metallic ultradispersed catalyst composition comprising the steps of: preparing a first precursor solution containing a metal salt of a Group VI B metal; preparing second and third precursor solutions containing a metal salt of a Group VI B metal with a sulphiding agent and a Group VIII B metal, respectively; admixing the first, second and third precursor solutions with a hydrocarbon feedstock to form separate microemulsions; and, admixing the first, second and third microemulsions to form a tri-metallic microemulsion mixture.

In one embodiment, the tri-metallic microemulsion mixture is subjected to a decomposition process to form an ultradispersed catalyst composition. In other embodiments, the tri-metallic microemulsion mixture is introduced into a reaction process to form an ultradispersed catalyst composition within the reaction process.

In each embodiment, one or more surfactants may be added to any one or a combination of the precursor solutions.

Other aspects and features of the present invention will become apparent to those ordinarily skilled in the art upon review of the following description of specific embodiments of the invention.

DETAILED DESCRIPTION

Ultradispersed catalyst compositions for use in hydrocarbon reaction processes and methods of preparation are described herein.

Catalyst Compositions

In accordance with a first embodiment of the invention, catalyst compositions characterized by their particle size and ability to form microemulsions are described. The catalyst compositions are bi- or tri-metallic compositions dissolved in a protic medium containing a VIII B non-noble metal and at least one VI B metal (preferably one or two) in the presence of a sulfiding agent. The atomic ratio of the Group VI B metal to Group VIII B non-noble metal is from about 15:1 to about 1:15. The catalyst compositions according to the invention can be used in a variety of hydrocarbon catalytic processes to treat a broad range of feeds under wide-ranging reaction conditions such as temperatures from 200° C. to 480° C.

More specifically, the invention describes bi-metallic catalysts of the general formula:

$$B_xM_yS_{[(1.1 \text{ to } 4.6)y+(0.5 \text{ to } 4)x]}$$

where B is a group VIIIB non-noble metal and M is a group VI B metal and $0.05 \leq y/x \leq 15$.

In more specific embodiments, $0.2 \leq y/x \leq 6$ and preferably $y/x=3$.

The invention also provides a second class of catalysts described as tri-metallic catalysts of the general formula:

$$B_xM1_yM2_zO_{(2 \text{ to } 3)z}S_{[(0.3 \text{ to } 2)y+(0.5 \text{ to } 4)x]}$$

where B is a group VIIIB non-noble metal and M1 and M2 are group VI B metals and $0.05 \leq y/x \leq 15$ and $1 \leq z/x \leq 14$.

In more specific embodiments of the tri-metallic catalysts, the y/x ratio is in the range of $0.2<y/x<6$. The range z/x is preferably determined by the desired use of the catalyst. For example, selectivity to lighter hydrocarbons (C1-C5) will preferably have a z/x of $10<z/x<14$ and more preferably z/x=12. Alternatively, selectivity to intermediate hydrocarbons for mild hydrocracking (Low cracking functionality) will favor $1<z/x<5$ and preferably z/x=3.

Formula Examples

As examples, if y/x=0.05, y=1 and x=20. Thus, at this y/x ratio, $$B_xM_yS_{[(1.1 \text{ to } 4.6)y+(0.5 \text{ to } 4)x]}$$

would include catalyst compositions ranging from $B_{20}MS_{11.1}$ to $B_{20}MS_{8466}$.

If y/x=15, y=15 and x=1, at this y/x ratio, $$B_xM_yS_{[(1.1 \text{ to } 4.6)y+(0.5 \text{ to } 4)x]}$$

and would include catalyst compositions ranging from $BM_{15}S_{17}$ to $BM_{15}S_{73}$.

Particle Size Characterization

The particle sizes within the microemulsion preferably have a median particle diameter between 30 nm to 6000 nm, and more preferably between 60 nm to 2500 nm. The sizes, chemical compositions and structures of such particles are verified using known techniques such as dynamic light scattering (DLS), X-Ray diffraction (XRD), transmission electron microscopy (TEM), small angle X-ray diffraction, X-ray photoelectron spectroscopy (XPS) and others.

Constituent Metals

The Group VI B metals include chromium, molybdenum, tungsten and mixtures thereof. The Group VIII B non-noble metals include, iron, cobalt, nickel or mixtures thereof. Preferably, the combinations of the metals are iron, cobalt, nickel or mixtures thereof with chromium, molybdenum, tungsten or mixtures thereof. The suitable Group VI B metals which are at least partly in the solid state before contacting the protic medium, comprise polyanions such as molybdates, tungstates, chromates, dichromate; or oxides such as molybdenum oxides, tungsten oxides, chromium oxides. The suitable Group VIII B non-noble metals comprise water-soluble metal salts such as acetate, carbonate, chloride, nitrate, actylacetonate, citrate and oxalate.

Process

Active catalyst compositions are formed from catalyst precursor solutions. The catalyst precursor solutions are combined with a hydrocarbon feedstock for a particular processing reaction under conditions to promote the formation of a microemulsion utilizing the following general methodology.

Bi and Tri-Metallic Catalyst Preparation

Separated or combined metal saturated aqueous precursor solutions are prepared under appropriate conditions (temperature between 20 to 50° C. and 1 atm). In the case of a bi-metallic catalyst, one (for combined solutions) or two metal saturated aqueous solutions are prepared whereas for a tri-metallic catalyst, one, two (for combined solutions) or three metal saturated aqueous solutions are prepared.

The first precursor solution contains metal salts of Group VI B or VIII B non-noble metals; the second contains metal salts of Group VI B or Group VIII B non-noble metals and the third solution contains Group VI B metal. For aqueous solutions which contain Group VI B metals, ammonium sulphide can be admixed under controlled conditions of pH to form thio salts.

Following preparation of the precursor solutions, each solution is admixed with a hydrocarbon feedstock under conditions to form one or more separated microemulsions. Nonionic surfactant with an HLB (Hydrophilic-Lipophilic balance) between 4 and 14 may be optionally added to enhance the microemulsion formation. Other surfactants may also be used.

To prepare a bi-metallic catalyst from separate microemulsions, one containing metal salts of Group VI B and ammonium sulphide and the other containing an VIII B non-noble metal, are mixed.

The bi-metallic microemulsion may be optionally sent through a decomposition process under certain operating conditions (temperature between 150-450° C. and pressure between 1 atm-70 atm, and more preferably temperature between 225-325° C. and pressure between 14 atm-28 atm) to remove the protic medium and to produce the ultradispersed catalyst before sending it into the reactor.

To prepare a tri-metallic catalyst from separate microemulsions, three precursor microemulsions, one containing metal salts of Group VI B and ammonium sulphide, another containing VIII B non-noble metals and the last one containing metal salts of Group VI B, are mixed.

To prepare a tri-metallic catalyst from two microemulsions; one containing two metal salts of Groups VI B and VIII B non-noble metals with ammonium sulphide and another containing metal salts of Group VI B; are mixed.

The tri-metallic microemulsion is optionally sent through a decomposition process under certain operating conditions (temperature between 150-450° C. and pressure between 1 atm-70 atm, and more preferably temperature between 225-325° C. and pressure between 14 atm-28 atm) to produce the ultradispersed catalyst.

In an alternate embodiment, the precursor solutions are combined before admixing with the hydrocarbon feedstock in order to form a single microemulsion. This method of formation may be applied to both the bi-metallic and tri-metallic catalyst systems.

Catalyst Production and Use

A particular advantage of the invention is the ability to produce different catalysts particularly suited to different process.

EXAMPLES

The following examples demonstrate the synthesis and uses of the bi-metallic catalysts from the present invention for various hydrocarbon processing applications.

Example 1

Co—Mo(S) bi-metallic catalysts were prepared using the following procedure. A first aqueous solution containing 20 wt % ammonium heptamolybdate (AHM) was mixed with an aqueous solution containing 50 wt % ammonium sulphide at a S:Mo ratio of 4:1 at a temperature of 25° C. and pressure of 1 atm. The resulting solution was mixed with a hydrocarbon stream (Base Oil) containing surfactant Span 80 to stabilize the formed a microemulsion wherein the hydrocarbon component was 95 wt % of the microemulsion and Mo was 4750 ppm with respect to the hydrocarbon.

A second aqueous solution containing 22.5 wt % of cobalt acetate, $Co(OAc)_2$ was mixed with a hydrocarbon stream (Base Oil) containing surfactant Span 80 to stabilize the formed microemulsion wherein the hydrocarbon component was 95 wt % of the second microemulsion and Co was 1240 ppm with respect to the hydrocarbon.

These separated emulsions are mixed in a decomposition process at 250° C. and 1 atm in a continuous manner to form the dispersed catalyst. The catalyst size obtained measured by dynamic light scattering (DLS) was 438 nm.

Example 2

Ni—W(S) bi-metallic catalysts were prepared using the following procedure. A solution containing 29.7 wt % ammonium metatungstate (AMT) was mixed with an aqueous solution containing 50 wt % ammonium sulphide at a S:Mo ratio of 2:1 at a temperature of 25° C. and pressure of 1 atm. The resulting solution was mixed with a hydrocarbon stream containing 2% Span 80™ (a surfactant) to form a microemulsion. The hydrocarbon stream was a vacuum gas oil sample (VGO1) having a composition as shown in Table 1 wherein the hydrocarbon component was 97 wt % of the microemulsion and W was 4750 ppm with respect to the hydrocarbon.

TABLE 1

| Cut (° C.) | % wt |
|---|---|
| 0-273 | 4 |
| 273-380 | 33 |
| 380-450 | 33 |
| 450+ | 30 |
| S | 3.36 |
| API Gravity | 18.6 |

A second solution containing 15 wt % of nickel acetate, $Ni(OAc)_2$ was mixed with a hydrocarbon stream containing Span 80™ and VGO1 to form a second microemulsion wherein the hydrocarbon component was 94 wt % of the second microemulsion and Ni was 1250 ppm with respect to the hydrocarbon.

These separated emulsions were mixed in a processing unit to form the bi-metallic catalyst and perform a hydrotreating reaction under conditions presented in Table 2.

TABLE 2

| Reaction Conditions | |
|---|---|
| Temperature (° C.) | 320 |
| Pressure (MPa) | 8 |
| LHSV ($h^{-1}$) (Liquid Hour Space Velocity) | 0.5 |
| $H_2$ flow (SCCM) (Standard cubic centimeters per minute) | 100 |

The resulting oil characterization is shown in Table 3 and shows the effectiveness of the catalyst in removing sulphur, increasing API number and reducing heavy fraction.

TABLE 3

| Cut (° C.) | % wt |
|---|---|
| 0-273 | 6 |
| 273-380 | 36 |
| 380-450 | 34 |
| 450+ | 24 |
| S | 0.5 |
| API Gravity | 23 |

Example 3

Co—Mo(S) bi-metallic catalysts were prepared using the following procedure. A first solution containing 22.3 wt % ammonium heptamolybdate (AHM) was mixed with a second solution containing 22 wt % of cobalt acetate, $Co(OAc)_2$ and the resulting solution were mixed with an aqueous solution containing 50 wt % ammonium sulphide at a S:Mo ratio 8:1 at a temperature of 25° C. and pressure of 1 atm. The resulting solution was mixed with a hydrocarbon stream (VGO1) to form a microemulsion wherein the hydrocarbon component was 95 wt % of the microemulsion with Co content 4650 ppm and Mo content 1350 ppm with respect to the hydrocarbon. The reaction conditions were the same as example 2.

The resulting oil characterization is shown in Table 4 and shows the effectiveness of the catalyst in reducing sulphur content.

TABLE 4

| Cut (° C.) | % wt |
|---|---|
| 0-273 | 5 |
| 273-380 | 35 |
| 380-450 | 32 |
| 450+ | 28 |
| S | 0.3 |
| API Gravity | 19 |

Example 4

Ni—W(S)/MoO$_3$ tri-metallic catalysts were prepared using the following procedure. A solution containing 15 wt % ammonium metatungstate (AMT) was mixed with an aqueous solution containing 50 wt % ammonium sulphide at a S:W ratio 5:1 at a temperature of 25° C. and pressure of 1 atm. The resulting solution was mixed with a hydrocarbon stream (VGO1) containing Span 80™ to form a microemulsion wherein the hydrocarbon component was 95 wt % of the microemulsion and W was 1850 ppm with respect to the hydrocarbon.

A second solution containing 15 wt % of nickel acetate, Ni(OAc)$_2$ was mixed with a hydrocarbon stream (VGO1) containing Span 80T" to form a second microemulsion wherein the hydrocarbon component was 95 wt % of the second microemulsion and Ni was 580 ppm with respect to the hydrocarbon.

A third solution containing 23 wt % of ammonium heptamolybdate (AHM) was mixed with a hydrocarbon stream (VGO1) containing Span 80T™ to form a third microemulsion wherein the hydrocarbon component was 95 wt % of the second microemulsion and Mo was 3580 ppm with respect to the hydrocarbon.

These separated emulsions were mixed in a processing unit to form a tri-metallic catalyst and perform a catalytic reaction under conditions shown in Table 5.

TABLE 5

| Reaction Conditions | |
|---|---|
| Temperature (° C.) | 390 |
| Pressure (MPa) | 10 |
| LHSV (h$^{-1}$) | 0.5 |
| H$_2$ flow (SCCM) | 100 |

The resulting oil characterization is shown in Table 6 and shows the effectiveness of the catalyst in reducing sulphur content and hydrocracking.

TABLE 6

| Cut (° C.) | % wt |
|---|---|
| 0-273 | 28 |
| 273-380 | 38 |
| 380-450 | 18 |

TABLE 6-continued

| | % wt |
|---|---|
| 450+ | 16 |
| S (% wt) | 0.27 |
| API Gravity | 14 |

Particle Size Characterization

Various catalysts were evaluated to determine the particle size distribution of the catalysts using dynamic light scattering (DLS). DLS irradiates a liquid sample with light and observing time-dependent fluctuations in the scattered intensity using a suitable detector. These fluctuations arise from random thermal (Brownian) motion and the distance between them is therefore constantly varying. Analysis of the time dependence of the intensity fluctuation can yield the diffusion coefficient of the particles and the hydrodynamic radius or diameter of the particles can be calculated.

DLS indicated general particle size ranges as follows:
bimetallic Ni—W—148 to 534 nanometers (nm)
Co—Mo—380 to 665 nm
tri-metallic Ni—W—Mo—380 to 665 nm The measurements were checked using scanning electron microscopy (SEM). It is also understood that the foregoing size ranges are representative only and only refer generally to observed size ranges for specific catalyst compositions. It is understood by those skilled in the art that different size ranges may be realized in accordance with the invention either within or outside the size range examples given above.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A catalyst composition of the general formula:

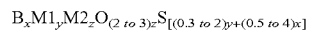

$$B_xM1_yM2_zO_{(2\ to\ 3)z}S_{[(0.3\ to\ 2)y+(0.5\ to\ 4)x]}$$

where B is a group VIIIB non-noble metal and M1 and M2 are group VI B metals and $0.05 \leq y/x \leq 15$ and $1 \leq z/x \leq 14$
and wherein the catalyst composition is an ultradispersed suspension in a hydrocarbon solvent with a median particle diameter from 30 nm to 6000 nm.

2. A catalyst composition as in claim 1 wherein $0.2 \leq y/x \leq 6$.

3. A catalyst composition as in claim 1 wherein z/x is $10 \leq z/x \leq 14$.

4. A catalyst composition as in claim 3 wherein z/x is 12.

5. A catalyst composition as in claim 3 wherein $1 \leq z/x \leq 5$.

6. A catalyst composition as in claim 5 wherein z/x=3.

7. A catalyst composition as in claim 1 wherein the ultradispersed suspension is characterized by a median particle diameter between 60 nm to 2500 nm.

* * * * *